(12) United States Patent
Bush

(10) Patent No.: US 9,309,992 B2
(45) Date of Patent: Apr. 12, 2016

(54) SYSTEM FOR DETECTING THAT A VALVE SHOULD BE REPLACED AND A METHOD OF USE THEREOF

(71) Applicant: SDB IP Holdings, LLC, Oviedo, FL (US)

(72) Inventor: Shawn D. Bush, Orlando, FL (US)

(73) Assignee: SDB IP Holdings, LLC, Oviedo, FL (US)

(*) Notice: Subject to any disclaimer, the term of this patent is extended or adjusted under 35 U.S.C. 154(b) by 93 days.

(21) Appl. No.: 14/208,882

(22) Filed: Mar. 13, 2014

(65) Prior Publication Data

US 2014/0261740 A1    Sep. 18, 2014

Related U.S. Application Data

(60) Provisional application No. 61/787,227, filed on Mar. 15, 2013.

(51) Int. Cl.
*E03D 1/34* (2006.01)
*F16K 37/00* (2006.01)
*F16K 31/40* (2006.01)
*E03D 3/06* (2006.01)

(52) U.S. Cl.
CPC .............. *F16K 37/0083* (2013.01); *E03D 1/34* (2013.01); *E03D 3/06* (2013.01); *F16K 31/402* (2013.01); *F16K 37/00* (2013.01); *F16K 37/0091* (2013.01); *Y10T 137/0441* (2015.04); *Y10T 137/8158* (2015.04)

(58) Field of Classification Search
CPC .............. F16K 37/0083; F16K 31/402; F16K 37/0091; F16K 37/00; E03D 3/06; E03D 1/34; Y10T 137/0441; Y10T 137/8158
See application file for complete search history.

(56) References Cited

U.S. PATENT DOCUMENTS

| | | | |
|---|---|---|---|
| 4,301,992 A | 11/1981 | Karbo | |
| 4,336,918 A * | 6/1982 | Karbo | ............................. 251/46 |
| 4,477,051 A | 10/1984 | Ben-Yehuda | |
| 4,787,413 A | 11/1988 | Saggers | |
| 4,797,820 A | 1/1989 | Wilson et al. | |
| 4,893,645 A | 1/1990 | Augustinas et al. | |
| 5,853,026 A | 12/1998 | Wlodarczyk et al. | |
| 6,557,580 B2 | 5/2003 | Lohde et al. | |
| 8,091,860 B2 * | 1/2012 | Thompson et al. | ...... 251/129.04 |
| 8,368,518 B1 * | 2/2013 | Castrovinci | ................ 340/10.51 |
| 8,480,612 B2 * | 7/2013 | Kassem | ............................. 604/9 |
| 8,843,241 B2 * | 9/2014 | Saberi et al. | .................. 700/287 |

* cited by examiner

*Primary Examiner* — Kevin Lee
(74) *Attorney, Agent, or Firm* — The Webb Law Firm

(57) ABSTRACT

A system for detecting a valve replacement element including a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication is disclosed. The main valve element includes a replaceable portion. The system also includes a sensor for monitoring usage of the replaceable portion of the main valve element, and an indicator in communication with the sensor for alerting an operator when the replaceable portion of the main valve element should be replaced.

26 Claims, 4 Drawing Sheets

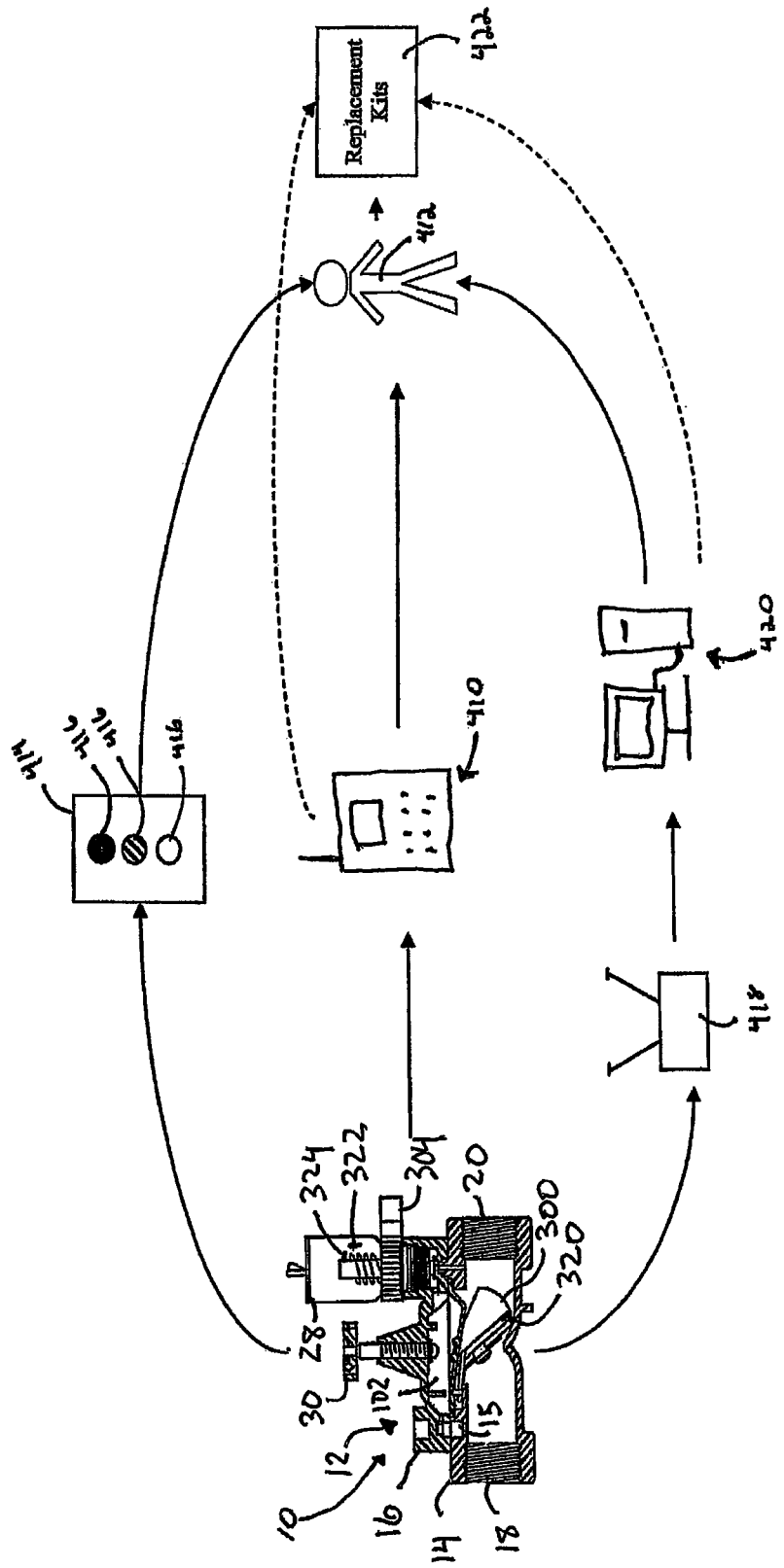

SYSTEM FOR DETECTING THAT A VALVE SHOULD BE REPLACED AND A METHOD OF USE THEREOF

CROSS-REFERENCE TO RELATED APPLICATION

The present application claims priority to U.S. Provisional Application Ser. No. 61/787,227, filed Mar. 15, 2013, entitled "System for Detecting a Valve Replacement Kit and a Method of Use Thereof", the entire disclosure of which is hereby incorporated by reference.

BACKGROUND OF THE INVENTION

1. Field of the Invention

The present invention relates generally to a valve replacement kit for a flush valve, and more particularly, to a system and method for monitoring the valve replacement kit to determine when installation of a new valve replacement kit is required.

2. Background of the Related Art

Most waste water systems, such as the flushing systems for urinals, commodes, and the like, include a flush valve having a valve element such as a flapper assembly configured to transition from an open position, where fluid is permitted to pass through the valve, to a closed position, in which fluid flow is prevented. In conventional flush valves, in the closed position, the valve element is configured to sealingly engage a valve seat. However, following prolonged use, the seal between the valve seat and valve element may weaken causing the valve to leak or fail entirely. When the valve element fails, it must be replaced.

Valve replacement kits for flush valves are well known and are commercially available from numerous valve manufacturers including I-CON Systems, Inc. of Oviedo, Fla. A valve replacement or rebuild kit may include a number of elements of a flush valve including, but not limited to, a valve element including a flapper assembly, plastic support rings for said assembly, and/or metering gasket and cup assemblies configured to assist in adjusting or controlling the maximum opening position of the valve element.

For large facilities such as apartment complexes, dormitories, jails, prisons, or detention centers, which have large numbers of toilets and associated flush valves, anticipating when any specific valve may fail and must be replaced is often difficult. Generally, the facility must rely on careful record keeping of when valves were rebuilt or, replaced, approximate usage, and estimated lifecycle to estimate when a valve will fail. Flush valves which are near the end of their lifecycle must be carefully monitored to assess their functionality. In addition, the facility must have a sufficient number of replacement kits on hand so that when a valve fails, it can be rebuilt as quickly as possible to avoid unnecessary inconvenience for users and maintenance personnel.

At present, most facilities simply wait for a valve to break and replace it as required. Some facilities attempt to keep records to anticipate when a valve will break and have procedures in place for acquiring replacement parts for valves which are believed to be near the end of their lifecycles. However, these attempts to monitor the lifecycle of existing valves are often imprecise and require employees to be especially diligent in monitoring aging valves and replacement part acquisition practices. In addition, the valve is not replaced until it actually breaks, meaning that the valve must be replaced quickly and without warning to avoid disturbing operation of the facility.

Therefore, there is a need for a more effective system for monitoring a valve replacement kit that is capable of monitoring use of an individual flush valve and alerting operators when a valve is nearing the end of its anticipated lifecycle. In this way, operators would be aware of which individual valves are most likely to fail and could monitor those valves more closely. Furthermore, it would be advantageous to integrate the monitoring system with an acquisition system for replacement parts so there are sufficient replacement valves on hand for all outer valves that may need to be replaced in the near future. It would also be advantageous if the valve body itself included visual indicators to alert operators of the age of the valve and the anticipated time until the valve fails. Finally, it would be advantageous if the system also monitored the operation of individual valves to provide a more accurate indication of how the valve is functioning and the time until the valve ultimately fails. In this way, the operator would be able to rely not only on the anticipated lifespan of the valve, but also on the actual operation of the valve itself to provide a more sophisticated approximation of when the valve will fail and must be replaced. The system and method of the present application are configured to provide such advantages to improve the monitoring and replacement of valve replacement kits for flush valves.

SUMMARY OF THE INVENTION

In accordance with an embodiment of the present invention a system for detecting a valve replacement element includes a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication. The main valve element includes a replaceable portion. The system also includes a sensor for monitoring usage of the replaceable portion of the main valve element, and an indicator in communication with the sensor for alerting an operator when the replaceable portion of the main valve element should be replaced.

In certain configurations, the replaceable portion is the entire main valve element. The sensor may be configured to record each time the main valve element is actuated, and the indicator may alert the user when the main valve element has been actuated a predetermined number of times. The flush valve may also define a flow passage extending between the fluid inlet and the fluid outlet, and the flush valve may also include a cover and a diaphragm, with the diaphragm positioned between the cover and the flow passage to define a first chamber between the flow passage and the diaphragm, and a second chamber between the cover and the diaphragm.

The flush valve may also include a solenoid operationally communicating with a vent system for controlling a fluid pressure within the second chamber. The vent system of the flush valve may include a vent outlet, and the flush valve may include a plunger which, when energized by the solenoid, actuates to open or close the vent outlet to control the fluid pressure within the second chamber. A counter may be configured to record the number of times that the plunger is actuated by the solenoid. The flush valve may also include an additional sensor configured to monitor current provided to a solenoid of the flush valve. Optionally, the flush valve may also include an additional sensor configured to monitor fluid pressure within the flow passage to determine if a blockage is present in an outflow conduit downstream of the fluid outlet. A counter may be disposed on a handle of a toilet attached to the flush valve and the counter may measure the number of times that the handle is actuated.

In certain configurations, the sensor may include an identification tag disposed on the replaceable portion of the main valve element embedded with identifying information about the main valve element. The system may also include a reader apparatus for detecting the identification tag. The identification tag may include information including at least one of when the replaceable portion of the main valve element was installed and when the replaceable portion of the main valve element should be replaced.

In certain configurations, the indicator may be configured to alert the operator when the replaceable portion has been installed for a predetermined period of time. The indicator may provide a visual or auditory alert to the operator. The indicator may include a light emitting portion configured to provide a visual alert to the operator. The system may also include a wireless transmitter configured to provide data from the sensor to an external data management system. The data may include at least one of when the replaceable portion of the main valve element was installed and when the replaceable portion of the main valve element should be replaced.

Optionally, the system may also include an additional sensor configured to monitor a battery voltage of a battery coupled to the flush valve. Alternatively, or in addition to, the system may also include an additional sensor configured to monitor the number of times the main valve element is transitioned between the first position and the second position which are initiated by manual operation of a user, and the number of times the main valve element is transitioned from the first position to the second position which are initiated by electronic operation means. Furthermore, the system may include an additional sensor configured to monitor water quality of fluid passing through the flush valve. In another configuration, the system may include a close-to-failure indicator, which alerts an operator that the replaceable portion of the main valve element is nearing failure or a scheduled replacement.

In accordance with another embodiment of the present invention, a method for detecting replacement of a flush valve includes the step of providing a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication. The main valve element may include a replaceable portion. The method may also include the step of providing an identification tag on the main valve element, with the identification tag including information about at least one of when the replaceable portion of the main valve element was installed and when the replaceable portion of the main valve element should be replaced. The method also includes the steps of reading the information of the identification tag, and alerting an operator when the replaceable portion of the main valve element reaches a predetermined replacement age.

In certain configurations, the replaceable portion is the entire main valve element. The method may also include the step of recording each time the flush valve is actuated using a sensor and alerting the operator when the valve element has been actuated a predetermined number of times. The identification tag may be an RFID tag and the step of reading the identification tag is performed using a radio frequency reader. Optionally, the step of alerting an operator includes providing a visual or auditory alert to the operator.

BRIEF DESCRIPTION OF THE DRAWINGS

Additional advantages and details of the invention are explained in greater detail below with reference to the exemplary embodiments that are illustrated in the accompanying schematic figures.

FIG. 6 is a schematic diagram of a system for detecting a replaceable portion of a valve, such as the valve of FIG. 1.

DESCRIPTION OF THE PREFERRED EMBODIMENTS

Figure 1:
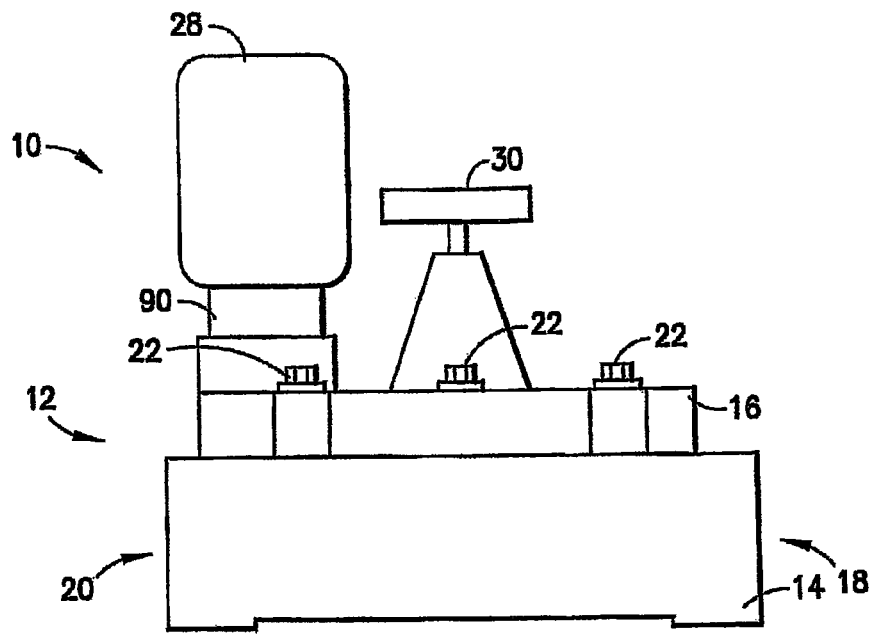
FIG. 1 is a left side view of a valve incorporating features of the invention.
Figure 2:
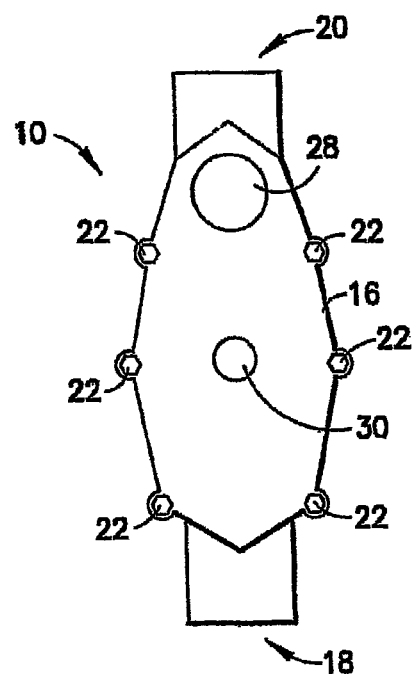
FIG. 2 is a top view of the valve of FIG. 1.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting.

FIGS. 1-5 show a valve 10 of the present invention. The basic components of the valve 10 will first be described in order to clarify the subsequent discussion of the invention.

In one non-limiting embodiment, the valve 10 can be a diaphragm-type valve having a valve housing 12 formed by a valve body 14 and a cover 16. The valve body 14 and/or cover 16 can be of any desired material, for example, metal or plastic. In one non-limiting embodiment, the valve body 14 and cover 16 are both made of plastic. Alternatively, one is made of plastic and the other of metal. The valve body 14 has a flow passage extending therethrough with an inlet end 18 and an outlet end 20. The cover 16 is connected to the valve body 14 by a plurality of cover screws 22 or bolts, such as aluminum or stainless steel screws engaged with the valve body 14. A diaphragm 26 of suitable material, such as rubber or plastic, is sandwiched between the valve body 14 and the cover 16 to form a seal between the two chambers of the valve 10. A main valve element 300, such as a flapper assembly, is positioned in the flow passage and the upper side of the main valve element 300 engages the central region of the diaphragm 26 when the valve 10 is assembled. In one embodiment, the main valve element 300 is a conventional swing check valve. The valve 10 further includes a solenoid 28 threadably attached to the cover 16 and operationally connected with a vent system to control water pressure in a control chamber formed above the diaphragm 26, as is typical in known diaphragm valves. In one non-limiting embodiment the vent system includes a passage, such as a crescent-shaped vent passage, in flow communication on one end with the control chamber and on the other end with a vent chamber. Flow through a vent outlet for the vent chamber is controlled by a plunger 29 associated with the solenoid 28, which can be moved to open or close the vent outlet. The valve 10 also includes a rotatable knob 30 that can be used to adjust or control the maximum opening position of the main valve element 300.

The valve 10 also includes a swing check retaining ring 302 to retain the valve element 300 in the valve body 14. In the illustrated embodiment, the solenoid 28 is connected to the valve cover 16 by a bleed plug or fitting 90. A manual override lever 304 can be operatively connected to the solenoid 28.

Figure 4:
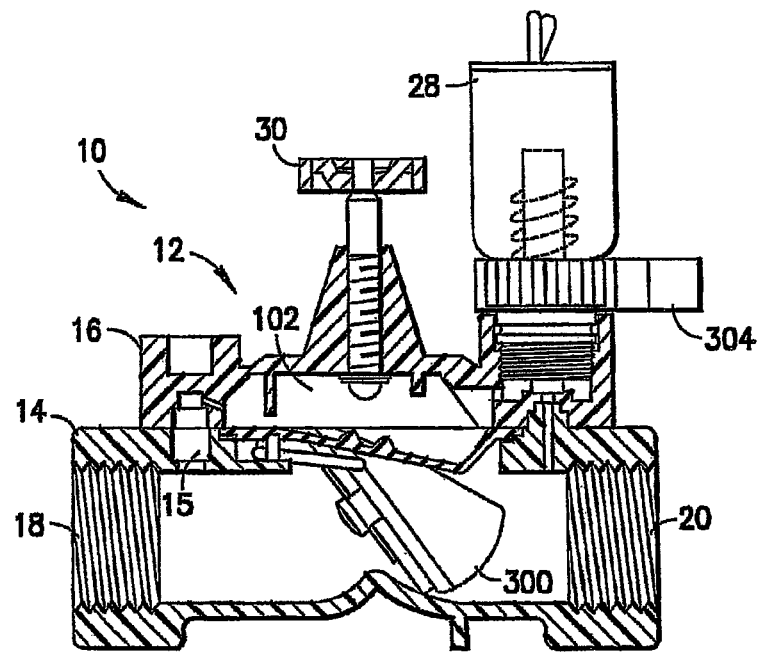
FIG. 4 is a right side, sectional view of the valve of FIG. 1 in a closed configuration.
Figure 5:
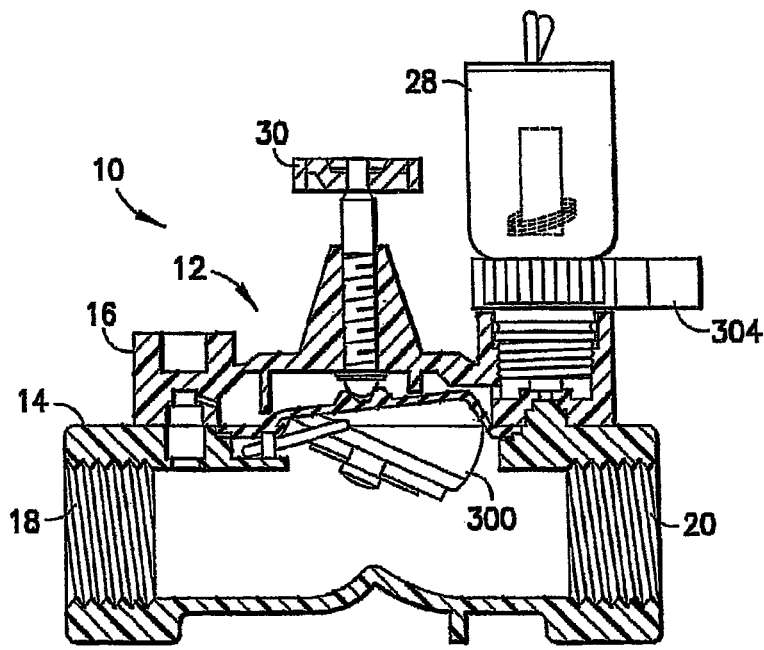
FIG. 5 is a right side, sectional view of the valve of FIG. 1 in an open configuration.

FIG. 4 shows the valve 10 in a closed configuration in which the valve element 300 blocks the flow passage, preventing fluid flow through the valve 10. FIG. 5 shows the valve 10 in an open configuration in which fluid can flow from the inlet end 18, through the flow passage, and out the outlet end 20.

The above-described diaphragm valve basic components and their operation will be well understood by one of ordinary skill in the diaphragm valve art and, hence, will not be described in any great detail. Examples of known diaphragm valves and their operation are described, for example, in U.S. Pat. Nos. 4,336,918; 4,301,992; 4,893,645; 4,797,820; 4,477, 051; 4,787,413; 5,853,026; and 6,557,580. However, unlike conventional diaphragm valves, the valve 10 of the present invention includes operational elements and/or a relief system in accordance with the invention, as will now be described, which make the valve 10 particularly useful as a flush valve in a waste water system.

Figure 3:
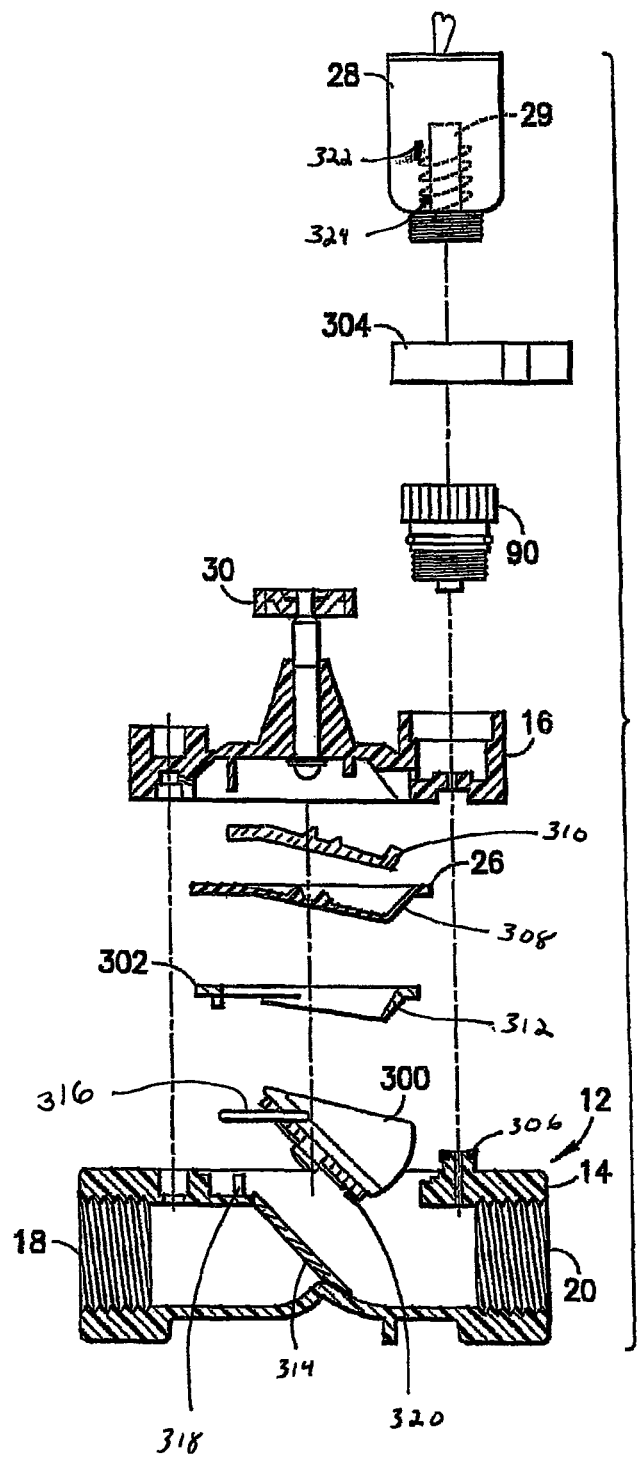
FIG. 3 is a right side exploded view of the valve of FIG. 1.

With particular reference to FIG. 3, in certain non-limiting embodiments, the valve element 300 includes certain replaceable elements. The replaceable elements are those parts of the valve 10 which wear out and/or fail following prolonged use, and may include the valve element 300 as well as a metering gasket assembly 308 and a cup assembly 310. It is further understood that other elements of the valve 10, including but not limited to, sealing members, o-rings, screws, bolts, or fasteners may also be replaced using the system of the present invention. As shown in FIG. 3, the valve element 300 is the portion of the valve 10 configured to transition from the open position to the closed position. The metering gasket assembly 308 and cup assembly 310 are configured to control or adjust the maximum opening position of the valve element 300. More particularly, a user can twist a rotatable knob 30 to control the open position of the valve element 300. Following prolonged use, these elements of the valve 10 wear out and must be replaced. An operator may obtain a replacement kit and replace the removable portions of the valve element 300. Replacing the removable portions of the valve element 300 ensures that the valve 10 will continue to function properly, thereby prolonging the useful life for the valve 10.

A method for taking apart the valve 10 and for replacing certain worn out elements of the valve 10 will now be described. With particular reference to FIG. 3, an exploded view of the valve 10, is provided which depicts elements of the valve 10 that can be replaced using a valve replacement kit. A user begins by removing a plurality of the cover screws 22 and the valve cover 16 from the valve body 14. The user may then remove any o-rings 306 from the underside of the cover 16. The user can clean and inspect the o-rings 306, however, unless there is visible damage to the o-ring 306, it can be replaced and reused. Next, the metering gasket 308, cup assembly 310, and valve element 300, including a plastic support ring 312 surrounding the flapper assembly, are removed and discarded. A user should also inspect a valve seat 314 to ensure that it is free of debris and structurally secure (e.g., free of nicks, cuts, holes). The new valve element 300 including the flapper assembly is then installed by engaging a flapper yoke 316 to the valve body 14, such as by inserting the yoke 316 to a fence 318. Once the valve element 300 is in place, a new plastic support ring 312 is placed around the valve element 300 and a new metering gasket 308 and cup assembly 310 are installed. Finally, the user reassembles the valve 10 by replacing the valve cover 16 and cover screws 22. If present, the pressure relief system including the solenoid 28 may be reattached to the threaded solenoid fitting 90.

Now that the structure of the valve 10 and method for rebuilding the valve 10 using replacement parts has been described, a system including the valve 10 and additional elements for monitoring valve 10 usage, condition, and lifecycle, in accordance with the present invention, will be described. More particularly, the presently invented system includes electrical components configured for monitoring the valve element 300 and, in certain embodiments, for alerting operators, support staff, or procurement/supply chain personnel about the condition of a valve 10 and when replacement parts should be ordered.

With particular reference to FIG. 6, in one embodiment, a replaceable portion of the valve 10 such as the valve element 300 is provided with an identification tag 320, such as a radio-frequency identification (RFID) tag. An electronic reader, such as an RFID reading apparatus 410, may be used to identify the specific valve element 300 installed in any flush valve in a facility such as a prison, detention center, or other large building. Once the specific valve element 300 is identified, certain information about the installed valve element 300 may be provided to an operator 412 including, but not limited to, the type of replacement part or repair kit needed to replace the valve element 300, the date that the valve element 300 was installed, the anticipated lifespan of the valve element 300, and the expected date when the new valve element 300 will need to be installed. Based on the provided information, the operator 412 may determine information including whether the valve 10 should be checked more carefully if it is nearing the end of its lifecycle and whether a replacement part should be ordered.

In a further non-limiting embodiment of the system, the valve 10 is configured with a sensor for measuring the actual usage of the valve 10. For example, a counting sensor 322 is disposed near the valve plunger 29, for measuring the number of times that the valve 10 is actuated. In one one-non limiting embodiment, a raised indicator 324 may be disposed on the plunger 29 body which trips the counter sensor each time the plunger 29 moves between the open and closed positions. The combination of the counting sensor 322 and raised indicator 324 may also be disposed on the diaphragm 26, the valve element 300, or any other convenient location which moves as the valve 10 transitions from the open position to the closed position. Alternatively, the counting sensor 322 may be disposed on an actuation device for the valve 10 such as an on/off actuation button or flush lever. However, it is noted that the number of times that the actuation device is engaged by a user does not necessarily correspond to the number of times that a valve 10 opens and closes. For example, a user may engage the actuation device twice in quick succession, but the valve 10 only opens one time. In either case, the counting sensor 322 is configured to monitor the number of times that the valve 10 is actuated. The information may be continuously or intermittently provided to an operator 412.

In certain embodiments, the valve 10 further includes an indicator 414 to alert the operator 412 when the valve element 300 has reached the end of its lifecycle and must be replaced. For example, the indicator 414 may include one or more light emitting diodes 416. In certain embodiments, the diodes 416 may present different color patterns corresponding to the condition of the valve 10. For example, one color pattern may indicate that the valve 10 is safe to use, a second color pattern may indicate that the valve 10 is nearing the end of its useful life, and a third color pattern may indicate that the valve 10 has exceeded its anticipated lifespan and that failure is imminent. Advantageously, the operator 412 can order replacement parts and schedule the valve 10 for repair with an indication that the valve 10 is near the end of its useful life is provided. In addition to visual indicators 414, such as LED bulbs, the indicator 414 may also include one or more of an audible indicator, a tactile indicator, or any other means of alerting an operator 412 as is known in the art. The indicator 414 may be disposed in any convenient and highly visible location on or around the valve 10 including, but not limited to, on the cover 16 of the valve 10 or on an external portion of a fixture attached to the valve 10.

In certain embodiments, the system further includes a data transmission interface such as a wireless transmitter 418 for transferring data about the condition of the valve 10 to an external device, such as a computer 420. The wireless transmitter 418 may use any wireless data transmission interface (e.g., Bluetooth, WiFi (e.g., IEEE 802.11a, b, g, n), cellular network or infrared interface, etc.) or a hard-wire connection such as Universal Serial Bus (USB) connector configured for uploading data to an external network and/or a suitable external device. Alternative exemplary external devices include, but are not limited to, tablet PCs, smart phones and/or an external hard drive or other device for backing up stored data.

The computer 420 may also include software for processing the received data and may perform functions such as recording data about the condition of the valve 10 and valve usage, comparing the recorded data to previously recorded usage and wear data to determine changes in condition over time, and/or determining an estimated remaining lifespan for the replaceable elements of the valve 10. This processed information may also be provided to the operator 412.

In certain embodiments, the system further includes additional sensors for measuring other useful data relevant for determining if the valve 10 and attached plumbing system are operating correctly. For example, a sensor may measure current and/or voltage supplied to the solenoid 28. The power required to activate the solenoid 28 (e.g., unseat the solenoid 28 to transition the valve 10 to the open position) increases as the solenoid 28 nears failure. Thus, continuously or intermittently monitoring power to the solenoid 28 provides an indication of whether the solenoid 28 is operating correctly or is nearing failure. A sensor may also be coupled to the power supply, such as the battery, to measure battery voltage output. A drop in voltage output suggests that the battery is failing and should be replaced. In addition, sensors may be disposed within the valve 10 to monitor whether fluid is flowing to and/or from the valve 10. For example, a sensor may monitor back pressure to determine whether a blockage is present in pipes leading from the valve 10. A sensor may also monitor water quality of water entering the valve 10 for the presence of chemicals or compounds that would affect the lifespan of the valve 10. The anticipated lifespan of the replaceable portions of the valve 10 may be modified based on the collected water quality data. A sensor may also measure and compare the number of times that the valve 10 is actuated manually (e.g., by pressing a button) and automatically (e.g., by an actuation device such as a motion detector). If the proportion of times that the valve 10 is actuated manually increases, it may indicate that the electronic or automatic actuation means is broken (e.g., the range from the motion detector needs to be adjusted or a sensor needs to be replaced). All of the additional information collected through the plurality of sensors described herein can be provided to the operator 412 either through an indicator disposed on the valve body 14, such as a visual display unit, or can be transmitted through the data transmitter 418 to the external reading device such as computer 420. The transmitted data can be analyzed by software on the computer 420 and the operator 412 may be alerted if problems with the operation of the valve 10 are detected. This information is also provided to the operator 412.

The operator 412 uses the information received from the visual indicator 414, RFID reader 410, and/or computer 420 to make certain decisions about the operation and physical condition of the valve 10. For example, the operator 412 may choose to examine valves which are near the end of their lifecycles more closely to ensure that they are working properly. The operator 412 may also choose to replace or rebuild older valves which are nearing the end of their lifecycles but have not yet failed. In addition, the operator 412 may take steps to ensure that replacement kits are available for all valves that are nearing the end of their lifecycle by contacting procurement personnel 422. Alternatively, the computer 420 and/or RFID reader 410 may be configured to automatically order additional replacement parts for all valves which are within a predetermined time of expected failure. Ordering replacement parts automatically ensures that operators 412 or other facility staff will not forget to obtain replacement parts as needed.

A further advantage of the present system is the ability to determine the type of parts, such as the replaceable portion of the main valve element, and the corresponding usage ratings. For example, it may be beneficial to determine whether the replaceable portion is sized for a 1.6 gallon per flush volume, a 1.28 gallon per flush volume, or a 3.5 gallon per flush volume. If the flush valve was installed for a 1.6 gallon per flush toilet, and an operate installs a 3.5 gallon per flush replaceable portion, the valve will flush 3.5 gallon per flush rather than 1.6 gallons per flush because the 3.5 gallon per flush replaceable portion has a larger flow area and will flow more water in the same amount of flush time. Using larger flush kits, and replaceable portions, is a way that certain operators may defeat the operational ranges of lower flush volume valves. When the system detects that a 3.5 gallon per flush kit has been installed into a toilet intended to flush 1.6 gallons per flush, the solenoid may be optimized to reduce the flush time such that only 1.6 gallons per flush are directed through the flush valve. Similarly, if a 1.0 gallon per flush kit was mistakenly installed on a urinal that is intended to deliver a 1.6 gallon flush, the solenoid can be optimized to increase the flush time to deliver the appropriate flush volume.

It will be readily appreciated by those skilled in the art that modifications may be made to the invented system and method without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A system for detecting that a valve should be replaced, the system comprising:
   a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication, the main valve element comprising a replaceable portion;
   a sensor for monitoring usage of the replaceable portion of the main valve element; and
   an indicator in communication with the sensor for alerting an operator when the replaceable portion of the main valve element should be replaced,
   wherein the sensor comprises a counter for recording each time the main valve element is actuated and wherein the indicator alerts the operator when the main valve element has been actuated a predetermined number of times, and
   wherein the counter is disposed on a handle of a toilet attached to the flush valve and the counter measures the number of times that the handle is actuated.

2. The system of claim 1, wherein the replaceable portion is the entire main valve element.

3. The system of claim 1, wherein the flush valve further defines a flow passage extending between the fluid inlet and the fluid outlet, the flush valve further comprising a cover and a diaphragm, the diaphragm positioned between the cover and the flow passage to define a first chamber between the flow passage and the diaphragm, and a second chamber between the cover and the diaphragm.

4. The system of claim 3, wherein the flush valve further comprises a solenoid operationally communicating with a vent system for controlling a fluid pressure within the second chamber.

5. The system of claim 4, wherein the vent system of the flush valve includes a vent outlet and wherein the flush valve further comprises a plunger which, when energized by the solenoid, actuates to open or close the vent outlet to control the fluid pressure within the second chamber.

6. The system of claim 5, wherein the counter is further configured to record the number of times that the plunger is actuated by the solenoid.

7. The system of claim 4, further comprising an additional sensor configured to monitor current provided to the solenoid of the flush valve.

8. The system of claim 3, further comprising an additional sensor configured to monitor fluid pressure within the flow passage to determine if a blockage is present in an outflow conduit downstream of the fluid outlet.

9. The system of claim 1, wherein the sensor comprises an identification tag disposed on the replaceable portion of the main valve element embedded with identifying information about the main valve element.

10. The system of claim 9, further comprising a reader apparatus for detecting the identification tag.

11. The system of claim 10, wherein the identification tag includes information including at least one of when the replaceable portion of the main valve element was installed and when the replaceable portion of the main valve element should be replaced.

12. The system of claim 1, wherein the indicator is configured to alert the operator when the replaceable portion has been installed for a predetermined period of time.

13. The system of claim 1, wherein the indicator provides a visual or auditory alert to the operator.

14. The system of claim 13, wherein the indicator comprises a light emitting portion configured to provide a visual alert to the operator.

15. The system of claim 1, further comprising a wireless transmitter configured to provide data from the sensor to an external data management system.

16. The system of claim 15, wherein the data includes at least one of when the replaceable portion of the main valve element was installed and when the replaceable portion of the main valve element should be replaced.

17. The system of claim 1, further comprising an additional sensor configured to monitor a battery voltage of a battery coupled to the flush valve.

18. The system of claim 1, further comprising an additional sensor configured to monitor the number of times the main valve element is transitioned between the first position and the second position which are initiated by manual operation of the operator, and the number of times the main valve element is transitioned from the first position to the second position which are initiated by electronic operation means.

19. The system of claim 1, further comprising an additional sensor configured to monitor water quality of fluid passing through the flush valve.

20. The system of claim 1, further comprising a close-to-failure indicator, which alerts the operator that the replaceable portion of the main valve element is nearing failure or a scheduled replacement.

21. A method for detecting that a flush valve should be replaced, the method comprising:
providing a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication, the main valve element comprising a replaceable portion;
providing an identification tag on the main valve element, the identification tag including information about at least one of when the replaceable portion of the main valve element was installed and when the replaceable portion of the main valve element should be replaced;
reading the information of the identification tag; and
alerting an operator when the replaceable portion of the main valve element reaches a predetermined replacement age.

22. The method of claim 21, wherein the replaceable portion is the entire main valve element.

23. The method of claim 21, further comprising recording each time the flush valve is actuated using a sensor and alerting the operator when the main valve element has been actuated a predetermined number of times.

24. The method of claim 21, wherein the identification tag is an RFID tag and wherein the step of reading the identification tag is performed using a radio frequency reader.

25. The method of claim 21, wherein the step of alerting an operator includes providing a visual or auditory alert to the operator.

26. A system for detecting that a valve should be replaced, the system comprising:
a flush valve including a fluid inlet, a fluid outlet, and a main valve element adapted for movement between a first position in which the fluid inlet and the fluid outlet are in fluid isolation, and a second position in which the fluid inlet and the fluid outlet are in fluid communication, the main valve element comprising a replaceable portion;
a sensor for monitoring usage of the replaceable portion of the main valve element;
an indicator in communication with the sensor for alerting an operator when the replaceable portion of the main valve element should be replaced; and
an additional sensor configured to monitor the number of times the main valve element is transitioned between the first position and the second position which are initiated by manual operation of the operator, and the number of times the main valve element is transitioned from the first position to the second position which are initiated by electronic operation means.

* * * * *